United States Patent
Yanagida (10) Patent No.: US 10,863,418 B2
(45) Date of Patent: Dec. 8, 2020

(54) COMMUNICATION MANAGING DEVICE AND COMMUNICATION SYSTEM

(71) Applicant: Yazaki Corporation, Tokyo (JP)

(72) Inventor: You Yanagida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/199,521

(22) Filed: Nov. 26, 2018

(65) Prior Publication Data

US 2019/0098558 A1 Mar. 28, 2019

Related U.S. Application Data

(63) Continuation of application No. PCT/JP2017/017722, filed on May 10, 2017.

(30) Foreign Application Priority Data

Jun. 27, 2016 (JP) ................. 2016-126220

(51) Int. Cl.
*H04W 76/30* (2018.01)
*H04W 48/06* (2009.01)
(Continued)

(52) U.S. Cl.
CPC ........... *H04W 48/06* (2013.01); *H04W 16/26* (2013.01); *H04W 24/04* (2013.01); *H04W 24/08* (2013.01);
(Continued)

(58) Field of Classification Search
CPC ..... H04W 48/06; H04W 72/04; H04W 24/04; H04W 72/082; H04W 72/0453;
(Continued)

(56) References Cited

U.S. PATENT DOCUMENTS 8,111,646 B1 * 2/2012 Chang ................. H04B 7/0413
370/316
8,848,608 B1 * 9/2014 Addepalli ......... H04W 72/0406
370/328
(Continued)

FOREIGN PATENT DOCUMENTS

JP       11-112413 A      4/1999
JP    2008-044489 A      2/2008
(Continued)

OTHER PUBLICATIONS

The Potential of Bluetooth in Automotive Applications: Aug. 2014 by Wunderlich, Schwad and Fredriksson.*
(Continued)

*Primary Examiner* — Jay P Patel
(74) *Attorney, Agent, or Firm* — Sughrue Mion, PLLC (57) ABSTRACT

A communication managing device includes a monitoring unit that monitors wireless communication between a plurality of communication devices performing the wireless communication in a vehicle on the basis of a common communication standard and a communication status improving unit that performs a countermeasure for improving a communication status of the wireless communication on the basis of a result of the monitoring. The communication managing device may further include transfer means that sends a message to an occupant in the vehicle, and the communication status improving unit may improve the communication status of the wireless communication by sending a message for requesting for avoiding wireless communication based on the communication standard in a portable device to the occupant via the transfer means.

9 Claims, 6 Drawing Sheets

(51) Int. Cl.
*H04W 16/26* (2009.01)
*H04W 24/04* (2009.01)
*H04W 72/04* (2009.01)
*H04W 24/08* (2009.01)
*H04W 72/08* (2009.01)

(52) U.S. Cl.
CPC ......... *H04W 72/04* (2013.01); *H04W 72/042* (2013.01); *H04W 72/0453* (2013.01); *H04W 72/082* (2013.01); *H04W 76/30* (2018.02)

(58) Field of Classification Search
CPC ... H04W 72/042; H04W 24/08; H04W 76/30; H04W 16/26
See application file for complete search history.

(56) References Cited

U.S. PATENT DOCUMENTS

| | | | | |
|---|---|---|---|---|
| 8,874,301 | B1* | 10/2014 | Rao | B60K 28/066 701/25 |
| 9,160,409 | B2 | 10/2015 | Kanayama | |
| 9,646,436 | B1* | 5/2017 | Campbell | G07C 9/00309 |
| 10,298,292 | B2* | 5/2019 | Choi | H05B 47/10 |
| 2002/0197955 | A1* | 12/2002 | Witkowski | G07C 5/008 455/41.1 |
| 2004/0048622 | A1* | 3/2004 | Witkowski | G07C 5/008 455/456.6 |
| 2006/0208169 | A1* | 9/2006 | Breed | G06K 9/00624 250/221 |
| 2010/0274607 | A1* | 10/2010 | Carresjo | G01M 1/28 705/7.11 |
| 2011/0257812 | A1* | 10/2011 | Carpenter | G01S 5/0027 701/2 |
| 2012/0287496 | A1* | 11/2012 | Nagel | G02F 1/163 359/267 |
| 2013/0204452 | A1* | 8/2013 | Yamaguchi | H04B 3/54 700/292 |
| 2014/0277988 | A1* | 9/2014 | Franganillo | B60W 10/02 701/93 |
| 2015/0249462 | A1* | 9/2015 | Chang | H03M 1/122 398/43 |
| 2015/0271201 | A1* | 9/2015 | Ruvio | G06N 20/00 726/23 |
| 2015/0358790 | A1* | 12/2015 | Nasserbakht | H04W 4/16 455/414.1 |
| 2016/0014786 | A1* | 1/2016 | Chang | H04B 7/2041 370/316 |
| 2016/0203310 | A1* | 7/2016 | Laifenfeld | G06F 21/44 726/6 |
| 2016/0288741 | A1* | 10/2016 | Shafer | B60R 16/0231 |
| 2016/0381055 | A1* | 12/2016 | Galula | H04L 67/12 726/23 |
| 2017/0174230 | A1* | 6/2017 | Goldman-Shenhar | B60W 50/10 |
| 2017/0295182 | A1* | 10/2017 | Teshler | H04L 63/0227 |
| 2017/0328678 | A1* | 11/2017 | Burke | B64C 39/024 |
| 2017/0352200 | A1* | 12/2017 | Wang | G07C 5/008 |
| 2017/0372431 | A1* | 12/2017 | Perl | G07C 5/008 |
| 2018/0373866 | A1* | 12/2018 | Sweeney | G06F 21/577 |

FOREIGN PATENT DOCUMENTS

| | | |
|---|---|---|
| JP | 2008-300976 A | 12/2008 |
| JP | 2010-093347 A | 4/2010 |
| JP | 2012-168922 A | 9/2012 |
| JP | 2015-088948 A | 5/2015 |
| JP | 2015-216595 A | 12/2015 |

OTHER PUBLICATIONS

Communication dated Dec. 18, 2018, from Japanese Patent Office in counterpart application No. 2016-126220.
Notification of Reason for Refusal for corresponding JP 2016-126220, dated Oct. 18, 2018.
International Search Report for PCT/JP2017/017722, dated Jul. 4, 2017.

* cited by examiner

COMMUNICATION MANAGING DEVICE AND COMMUNICATION SYSTEM

CROSS-REFERENCE TO RELATED APPLICATION

This application is a continuation application of International Application PCT/JP2017/017722, filed on May 10, 2017, which claims priority to Japanese Patent Application No. 2016-126220, filed on Jun. 27, 2016 and designating the U.S., the entire contents of which are incorporated herein by reference.

BACKGROUND OF THE INVENTION

1. Field of the Invention

The present invention relates to a communication managing device and a communication system.

2. Description of the Related Art

Conventionally, a technique of transmitting and receiving a signal via an electric wire or the like in a vehicle is known. Japanese Patent Application Laid-open No. 2012-168922 discloses a technique of a communication apparatus that provides communication via a cable connecting a power supply device and a load device.

In vehicles, it has been studied that wireless communication is introduced as communication means between devices. Here, there is likelihood that wireless communication between devices in a vehicle will be affected by wireless communication of a portable device getting from the outside to the inside of the vehicle or wireless communication will be destabilized due to a metallic case or the like brought into the vehicle. There is a demand for improvement in stability of wireless communication in a vehicle.

SUMMARY OF THE INVENTION

An object of the present invention is to provide a communication managing device and a communication system that can improve stability of wireless communication in a vehicle.

To achieve the above-described objective, a communication managing device according to one aspect of the present invention includes a monitoring unit configured to monitor wireless communication between a plurality of communication devices other than the communication managing device performing the wireless communication in a vehicle on the basis of a common communication standard; and a communication status improving unit configured to perform a countermeasure for improving a communication status of the wireless communication between the communication devices other than the communication managing device on the basis of a result of the monitoring.

According to another aspect of the present invention, the communication managing device further includes a transfer means configured to send a message to an occupant in the vehicle, wherein the communication status improving unit improves the communication status of the wireless communication between the communication devices other than the communication managing device by sending a message, via the transfer means, of requesting the occupant to avoid wireless communication based on the communication standard by a portable device.

According to still another aspect of the present invention, in the communication managing device, each of the communication devices other than the communication managing device belongs to one of a plurality of wireless subsystems having different communication bands to be used, and the communication status improving unit improves the communication status of the wireless communication between the communication devices other than the communication managing device by changing allocation of communication bands to the wireless subsystems.

According to still another aspect of the present invention, in the communication managing device, the communication status improving unit improves the communication status of the wireless communication between the communication devices other than the communication managing device by relaying the wireless communication between the communication devices other than the communication managing device.

To achieve the above-described objective, a communication system according to one aspect of the present invention includes a plurality of communication devices configured to perform wireless communication in a vehicle on the basis of a common communication standard; a monitoring unit other than the communication devices configured to monitor the wireless communication between the communication devices; and a communication status improving unit other than the communication devices configured to perform a countermeasure for improving a communication status of the wireless communication between the communication devices on the basis of a result of the monitoring.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a communication managing device and a communication system according to an embodiment of the present invention will be described in detail with reference to the accompanying drawings. The present invention is not limited to the embodiment. Elements in the following embodiment include elements which can be easily conceived by those skilled in the art or substantially identical elements.

Embodiment

Figure 1:
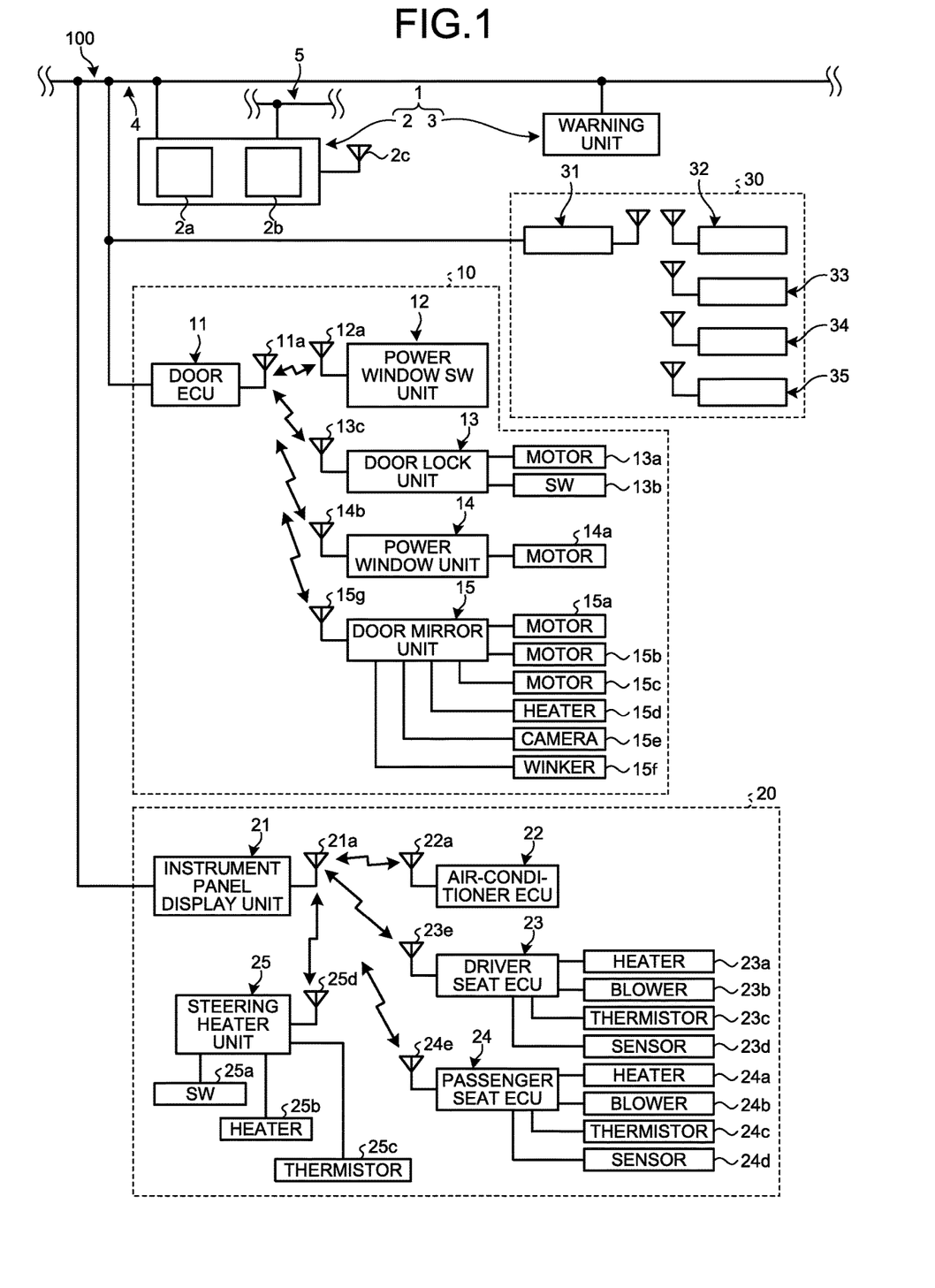
FIG. 1 is a diagram schematically illustrating a configuration of a communication system according to an embodiment.
Figure 2:
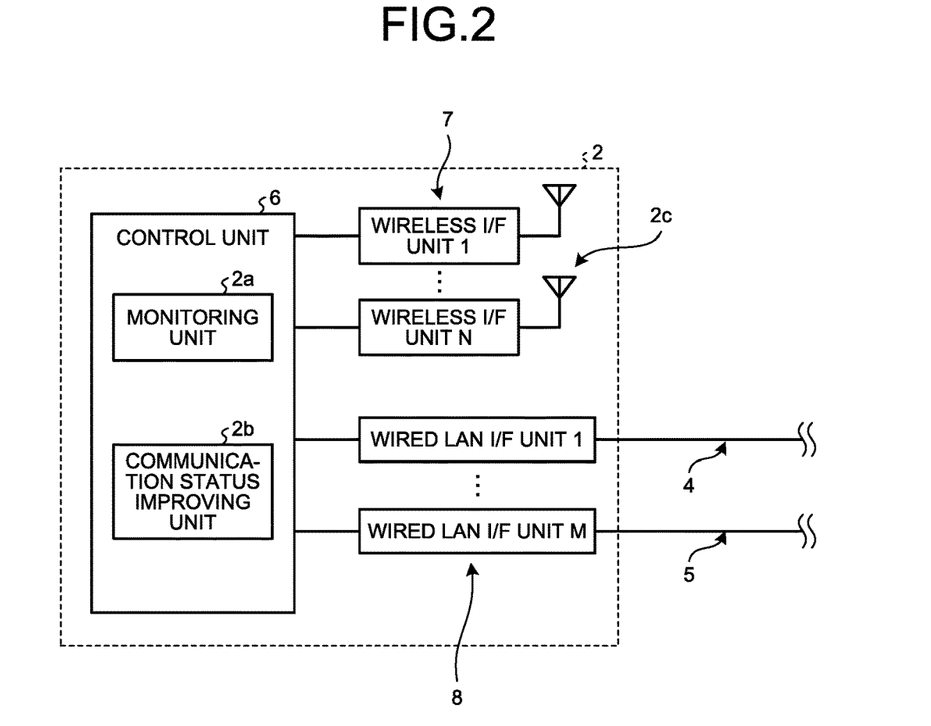
FIG. 2 is a block diagram of a managing unit according to the embodiment.

An embodiment will be described with reference to FIGS. 1 to 8. This embodiment relates to a communication managing device and a communication system. FIG. 1 is a diagram schematically illustrating a configuration of a communication system according to the embodiment and FIG. 2 is a block diagram of a managing unit according to the embodiment.

As illustrated in FIG. 1, a communication system 100 according to this embodiment includes a first wireless subsystem 10, a second wireless subsystem 20, a third wireless subsystem 30, and a communication managing device 1. The communication system 100 according to this embodiment is a wired-wireless composite LAN communication system that has a wireless communication monitoring function and performs appropriate operations if necessary.

The communication system 100 includes a managing unit 2 that monitors a wireless communication status and is connected to a wired LAN in a vehicle. More specifically, the managing unit 2 is connected to communication lines 4 and 5 of a wired LAN and includes a wireless communication antenna 2c. The managing unit 2 monitors a wireless communication status in the vehicle. When it is predicted that wireless communication will be destabilized as the result of monitoring, the managing unit 2 gives a warning to an occupant by a visual warning displayed on a meter or the like, an auditory warning from a speaker or the like, or a combination warning thereof.

When wireless communication of the first wireless subsystem 10, the second wireless subsystem 20, or the third wireless subsystem 30 is unstable, the managing unit 2 operates as a relay and stabilizes wireless communication. The communication system 100 performs appropriate operations when an abnormality in the wireless subsystems 10, 20, and 30 or an abnormality in the managing unit 2 has occurred.

The communication system 100 according to this embodiment is a wired-wireless composite LAN communication system that has various communication managing functions for effectively using wireless communication. More specifically, the managing unit 2 performs management and control of allocation of frequency channels or communication timings such that communications of a plurality of wireless subsystems 10, 20, and 30 do not interfere or collide with each other. Accordingly, simplification of a setting operation at the time of initial setting or addition of an optional communication device is realized. The managing unit 2 realizes effective use of wireless communication and simplification of a setting operation by performing communication management at the time of returning from an abnormal mode or the like. Communication management at the time of addition of an option will be described below. When an optional device having a wireless communication function is mounted in a vehicle, the managing unit 2 performs management and control of allocation of frequency channels or communication timings such that communications of the existing wireless subsystems 10, 20, and 30 do not interfere or collide with each other. That is, the managing unit 2 extends the communication system by adding an optional device to the existing wireless subsystems 10, 20, and 30.

The communication system 100 according to this embodiment is a wired-wireless composite LAN communication system that makes wired LAN communication redundant with wireless communication when a wired LAN has an abnormality. When malfunction of a wired LAN unit or malfunction of a wired LAN transmission line has occurred, wireless communication complements wired communication to improve redundancy.

Details of the communication system 100 according to this embodiment will be described below. The first wireless subsystem 10 is a control system that controls a door on a driver seat side. The first wireless subsystem 10 includes a door ECU 11, a power window switch unit 12, a door lock unit 13, a power window unit 14, and a door mirror unit 15.

The door ECU 11 is a control device that controls various operations in the door on the driver seat side and is an electronic control unit including a computer. The door ECU 11 controls the door lock unit 13, the power window unit 14, and the door mirror unit 15, for example, on the basis of a driver's operation input to an operation switch or an instruction received from another ECU. The power window switch unit 12 is a switch to which an operation of opening and closing a power window of the door on the driver seat side is input.

The door lock unit 13 includes a door lock mechanism which unlocks and locks the door on the driver seat side and which is not illustrated. The door lock unit 13 includes a motor 13a and a switch 13b. The motor 13a is an actuator that drives the door lock mechanism. The motor 13a switches the door lock mechanism between a locked state and an unlocked state. The switch 13b is a switch to which an operation of locking and unlocking the door lock mechanism on the driver seat side is input. The door lock unit 13 locks and unlocks the door on the driver seat side in accordance with an operation input to the switch 13b.

The power window unit 14 includes a motor 14a. The motor 14a is an actuator that opens and closes a window of the door on the driver seat side. The power window unit 14 opens and closes the window of the door on the driver seat side with a force generated from the motor 14a in accordance with the operation input to the power window switch unit 12.

The door mirror unit 15 includes motors 15a, 15b, and 15c, a heater 15d, a camera 15e, and a winker 15f. The motors 15a, 15b, and 15c are actuators that perform opening and closing or positioning of a door mirror. The heater 15d is a heating device that heats the door mirror. The camera 15e images the surroundings of the vehicle. The winker 15f is a direction indicator that is disposed in the door mirror.

The door ECU 11, the power window switch unit 12, the door lock unit 13, the power window unit 14, and the door mirror unit 15 have a function of a communication device and perform wireless communication in the vehicle on the basis of a common communication standard. The common communication standard in this embodiment is Bluetooth (registered trademark). The door ECU 11 includes a wireless communication antenna 11a. The units 12, 13, 14, and 15 include wireless communication antennas 12a, 13c, 14b, and 15g, respectively.

The door ECU 11 and the units 12, 13, 14, and 15 perform wireless communication with each other. The door ECU 11 transmits a command to the units 12, 13, 14, and 15 or acquires states of the units 12, 13, 14, and 15 by wireless communication. In the first wireless subsystem 10, a master unit is the door ECU 11 and the other units 12, 13, 14, and 15 are slave units.

The second wireless subsystem 20 is a control system associated with temperature adjustment in the vehicle. The second wireless subsystem 20 includes an instrument panel display unit 21, an air-conditioner ECU 22, a driver seat ECU 23, a passenger seat ECU 24, and a steering heater unit 25.

The instrument panel display unit 21 is disposed in an instrument panel of the vehicle. The instrument panel display unit 21 comprehensively controls temperature adjustment means in the vehicle including air conditioning. The instrument panel display unit 21 includes an operation input unit and a display unit. The operation input unit is a switch to which an operation associated with temperature adjustment is input, or the like. A set value for temperature adjustment, an operating state of temperature adjustment means, and the like are displayed on the display unit. The air-conditioner ECU 22 is a control device that controls an air conditioner.

The driver seat ECU 23 is a control device that controls the temperature of the driver seat. A heater 23a, a blower 23b, a thermistor 23c, and a sensor 23d are disposed in the driver seat. The heater 23a is a heating device that heats the driver seat. The blower 23b serves to adjust the temperature of the driver seat by blowing air and cools, for example, a seat surface. The thermistor 23c is a temperature sensor that detects the temperature of the driver seat. The sensor 23d detects whether a person sits on the driver seat. The driver seat ECU 23 is electrically connected to the heater 23a, the blower 23b, the thermistor 23c, and the sensor 23d.

The passenger seat ECU 24 is a control device that controls the temperature of a passenger seat. Similarly to the driver seat, a heater 24a, a blower 24b, a thermistor 24c, and a sensor 24d are disposed in the passenger seat. The passenger seat ECU 24 is electrically connected to the heater 24a, the blower 24b, the thermistor 24c, and the sensor 24d.

The steering heater unit 25 serves to adjust the temperature of a steering wheel. The steering heater unit 25 includes a switch 25a, a heater 25b, and a thermistor 25c. The switch 25a is a switch to which an operation of switching ON/OFF of the heater 25b is input. The heater 25b is a heating device that heats the steering wheel. The thermistor 25c is a temperature sensor that detects the temperature of the steering wheel. The steering heater unit 25 adjusts the temperature of the steering wheel using the heater 25b such that the temperature of the steering wheel reaches a target temperature on the basis of the temperature detected by the thermistor 25c.

The instrument panel display unit 21, the air-conditioner ECU 22, the driver seat ECU 23, the passenger seat ECU 24, and the steering heater unit 25 have a function of a communication device and performs wireless communication in the vehicle on the basis of a common communication standard. The units 21 and 25 and the ECUs 22, 23, and 24 in the second wireless subsystem 20 perform wireless communication on the basis of the communication standard common to the first wireless subsystem 10. The units 21 and 25 and the ECUs 22, 23, and 24 include wireless communication antennas 21a, 25d, 22a, 23e, and 24e, respectively. The driver seat ECU 23 and the passenger seat ECU 24 perform temperature adjustment of the driver seat and the passenger seat, for example, in accordance with a command from the instrument panel display unit 21. The steering heater unit 25 adjusts the temperature of the steering wheel, for example, in accordance with a command from the instrument panel display unit 21. In the second wireless subsystem 20, a master unit is the instrument panel display unit 21 and the other ECUs 22, 23, and 24 and the steering heater unit 25 are slave units.

The third wireless subsystem 30 is a control system that controls a door on the passenger seat side. Similarly to the first wireless subsystem 10, the third wireless subsystem 30 includes a door ECU 31, a power window switch unit 32, a door lock unit 33, a power window unit 34, and a door mirror unit 35. The door ECU 31 is a control device that controls various operations in the door on the passenger seat side. The door ECU 31 controls the door lock unit 33, the power window unit 34, and the door mirror unit 35. The power window switch unit 32 is a switch to which an operation of opening and closing a power window of the door on the passenger seat side is input.

The door lock unit 33 locks and unlocks the door on the passenger seat side in accordance with an operation input from an occupant. The power window unit 34 opens and closes the window of the door on the passenger seat side in accordance with an operation input to the power window switch unit 32. The door mirror unit 35 includes an actuator, a heater, a winker, and the like which are disposed in the door mirror on the passenger seat side.

The door ECU 31, the power window switch unit 32, the door lock unit 33, the power window unit 34, and the door mirror unit 35 have a function of a communication device and perform wireless communication on the basis of a common communication standard. The door ECU 31 and the units 32, 33, 34, and 35 in the third wireless subsystem 30 perform wireless communication on the basis of the communication standard common to the first wireless subsystem 10. The door ECU 31 and the units 32, 33, 34, and 35 include wireless communication antennas 31a, 32a, 33a, 34a, and 35a, respectively. In the third wireless subsystem 30, a master unit is the door ECU 31, and the other units 32, 33, 34, and 35 are slave units.

The communication managing device 1 includes a managing unit 2 and a warning unit 3. The managing unit 2 includes a monitoring unit 2a and a communication status improving unit 2b. The monitoring unit 2a monitors communication between a plurality of communication devices that perform wireless communication in the vehicle. The managing unit 2 is a communication device that performs wireless communication on the basis of the communication standard common to the wireless subsystems 10, 20, and 30. The managing unit 2 includes the wireless communication antenna 2c. The communication status improving unit 2b performs a countermeasure for improving a communication status of wireless communication on the basis of the monitoring result from the monitoring unit 2a.

The managing unit 2 is connected to the warning unit 3, the door ECU 11, the instrument panel display unit 21, and the door ECU 31 via the communication line 4. The communication line 4 is wired in the vehicle and is, for example, a LAN cable that connects control-system devices to each other. The managing unit 2, the warning unit 3, the door ECU 11, the instrument panel display unit 21, and the door ECU 31 perform wired communication with each other via the communication line 4. Examples of the communication standard via the communication line 4 include a CAN, a LIN, and ETHERNET (registered trademark). The communication line 5 is wired in the vehicle. The communication line 5 is a multimedia-system LAN cable. The communication standard via the communication line 5 is, for example, MOST. The managing unit 2 is connected to the multimedia-system devices via the communication line 5. That is, in this embodiment, a gateway interposed between networks with different communication standards also serves as the managing unit 2.

Details of the managing unit 2 will be described below. As illustrated in FIG. 2, the managing unit 2 includes a control unit 6, a wireless interface unit 7, a wired LAN interface unit 8, and the antenna 2*c*. The control unit 6 is an electronic control unit and performs operations of both the monitoring unit 2*a* and the communication status improving unit 2*b*. The control unit 6 stores a control program for serving as the monitoring unit 2*a* and the communication status improving unit 2*b* in advance. In the control unit 6, the monitoring unit 2*a* and the communication status improving unit 2*b* may be different control circuits or may be a common control circuit.

The wireless interface unit 7 is an interface that is interposed between the control unit 6 and the antenna 2*c*. The managing unit 2 includes a plurality of wireless interface units 7. The wireless interface units 7 correspond to the wireless subsystems 10, 20, and 30, respectively. The wired LAN interface unit 8 is an interface that is interposed between the control unit 6 and the communication line 4. The managing unit 2 includes a plurality of wired LAN interface units 8. The wired LAN interface units 8 correspond to wired communications of different systems. The managing unit 2 according to this embodiment includes at least a control-system wired LAN interface unit 8 connected to the communication line 4 and the multimedia-system wired LAN interface unit 8 connected to the communication line 5.

The warning unit 3 is transfer means that transfers a message to an occupant in the vehicle. The warning unit 3 according to this embodiment is disposed in a meter in front of the driver seat. The warning unit 3 transfers a message to an occupant, for example, using visual information such as characters or patterns. The warning unit 3 may transfer a message using auditory information such as sound or may transfer a message using vibration or the like instead of visual information or in addition to visual information.

The operation of the communication system 100 according to this embodiment will be described below. The communication system 100 performs an option addition process and a communication status improvement process in addition to initial setting and a normal process as will be described below.

(Initial Setting)

In initial setting, the communication system 100 performs a subsystem information acquiring process. The managing unit 2 instructs the master units of all the wireless subsystems 10, 20, and 30 to transmit subsystem information by wired communication.

Subsystem information is system information on wireless communication in the wireless subsystems 10, 20, and 30. The subsystem information includes the number of nodes, an amount of data, a communication speed, and a wireless output. The door ECUs 11 and 31 and the instrument panel display unit 21 which have received an instruction from the managing unit 2 transmit subsystem information of the belonging wireless subsystems 10, 20, and 30 to the managing unit 2. While the subsystem information is being requested and acquired, the warning unit 3 and the slave units of the wireless systems 10, 20, and 30 do not operate or perform appropriate operations. The warning unit 3 may display, for example, a message indicating that initial setting is being performed. For example, the slave units wait for an instruction from the master units.

Figure 3:
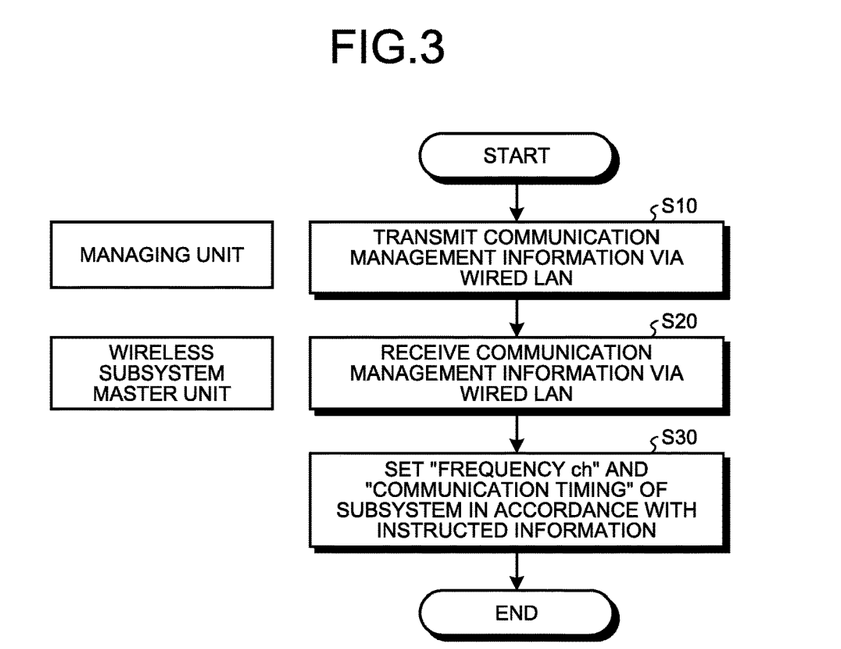
FIG. 3 is a flowchart associated with initial settings of a communication system according to the embodiment.

In initial setting, the communication system 100 performs a communication management information setting process. A part of a process flow associated with the initial setting is illustrated in FIG. 3. As illustrated in FIG. 3, the managing unit 2 transmits communication management information to the master units of the wireless systems 10, 20, and 30 by wired communication (Step S10). The communication management information includes allocation of frequency channels (communication bands) and communication timings. The frequency channels which are allocated to the wireless systems 10, 20, and 30 are determined such that interference or collision in wireless communication between the wireless systems can be avoided. The master units of the wireless systems 10, 20, and 30 receive communication management information from the managing unit 2 (Step S20). The master units set communication conditions of the wireless subsystems 10, 20, and 30 to which the master units belong on the basis of the acquired communication management information (Step S30). The slave units of the wireless subsystems 10, 20, and 30 perform wireless communication on the basis of the communication conditions set by the master units. When the communication management information setting process is completed, the warning unit 3 transfers a message indicating completion of initial setting to an occupant.

In initial setting, the master units of the wireless subsystems 10, 20, and 30 perform wireless output control or processes of storing information of the other wireless subsystems 10, 20, and 30, or the like. In the wireless output control, for example, the minimum wireless output with which communication can be stably performed in the belonging wireless subsystems 10, 20, and 30 is set.

(Normal Process)

A normal process of wireless communication will be described below. The managing unit 2 periodically transmits a normal state signal to the master units of the wireless subsystems 10, 20, and 30. The normal state signal may be transmitted by one of wireless communication and wired communication. The managing unit 2 continuously monitors the communication states of all the wireless subsystems 10, 20, and 30. The managing unit 2 periodically transmits communication management information to the master units of the wireless subsystems 10, 20, and 30 by wired communication.

The master units of the wireless subsystems 10, 20, and 30 periodically transmit a normal state signal to the managing unit 2. The normal state signal may be transmitted by one of wireless communication and wired communication. The master units perform appropriate operations whenever the communication management information is received from the managing unit 2. The master units may periodically update management information or only check the received communication management information.

While the normal process is being performed, the warning unit 3 stops the operation of transferring a message or performs an appropriate operation. When the normal process is being performed, the warning unit 3 sends, for example, a message indicating that the system operates normally to an occupant.

When a wireless communication abnormality in the wireless subsystems 10, 20, and 30 has been detected, the managing unit 2 performs an appropriate improvement process as will be described later. The wireless subsystems 10, 20, and 30 perform a process of improving a communication status of wireless communication in accordance with an instruction from the managing unit 2.

(Option Adding Process)

An option adding process will be described below. The option adding process is performed when a new wireless subsystem (hereinafter referred to as an "additional wireless subsystem") is added to the vehicle. When an optional additional wireless subsystem is connected by wired connection, that is, when a signal from a master unit of the additional wireless subsystem is received by wired communication, the managing unit 2 transmits a switching signal to an option addition operation by wired communication. The existing wireless subsystems 10, 20, and 30 having received the switching signal to the option adding operation prepare for update of the communication management information.

The managing unit 2 instructs all the existing wireless subsystems 10, 20, and 30 to return subsystem information by wired communication. In response to this instruction, the master units of the wireless subsystems 10, 20, and 30 transmit subsystem information of the corresponding wireless subsystems 10, 20, and 30 to the managing unit 2 by wired communication.

The managing unit 2 transmits new communication management information to the existing wireless subsystems 10, 20, and 30 and the additional wireless subsystem by wired communication. The wireless subsystems 10, 20, and 30 and the additional wireless subsystem having received the new communication management information change settings on the basis of the new communication management information and perform the normal process. By automatically performing the option adding process in this way, a setting operation at the time of adding an option is simplified. By allocating the channels of the wireless communication to the wireless subsystems 10, 20, and 30 and the additional wireless subsystem, wireless communication is effectively used.

(First Improvement Process)

Figure 4:
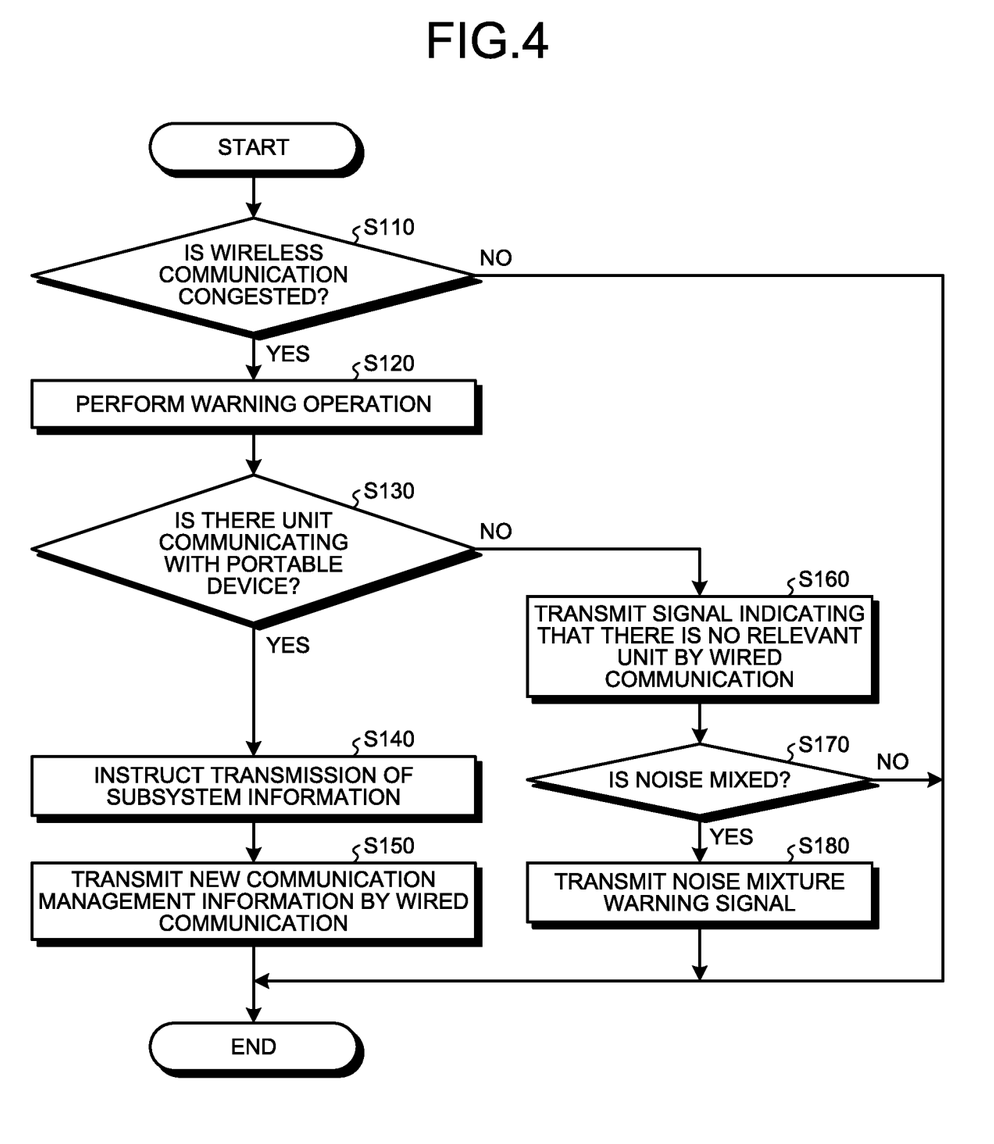
FIG. 4 is a flowchart of a first improvement process associated with the communication system according to the embodiment.

A communication status improvement process when a portable device is brought into the vehicle (hereinafter simply referred to as a "first improvement process") will be described below. Examples of the portable device include a smartphone and a hands-free talking device using wireless communication. FIG. 4 is a flowchart associated with the first improvement process. The flowchart illustrated in FIG. 4 is repeatedly performed by the managing unit 2. In Step S110, the managing unit 2 determines whether wireless communication is congested. For example, when an increase in a retransmission frequency or a channel occupation rate has been detected in one of the wireless subsystems 10, 20, and 30, the managing unit 2 determines YES in Step S110. The control flow transitions to Step S120 when the determination result of Step S110 is positive, and the control flow ends when the determination result thereof is negative.

In Step S120, the managing unit 2 performs a warning operation. The managing unit 2 transmits a warning to the warning unit 3 and the wireless subsystems 10, 20, and 30 by wired communication. The warning unit 3 having received a warning from the managing unit 2 transfers a warning message to an occupant. Examples of the warning message include a message indicating that wireless communication is congested and a message for requesting avoidance of wireless communication using the portable device. The wireless subsystems 10, 20, and 30 having received the warning prepare for update of the communication management information. When the warning operation is performed by the managing unit 2, the control flow transitions to Step S130.

In Step S130, the managing unit 2 determines whether there is a unit communicating with the portable device. The managing unit 2 transmits an inquiry to the wireless subsystems 10, 20, and 30, in which there is likelihood that they will be connected to the portable device by wireless communication, by wired communication. Specifically, the managing unit 2 inquires of the corresponding wireless subsystems 10, 20, and 30 about the connection state to the portable device by wireless communication. The wireless subsystems 10, 20, and 30 having received the inquiry returns the connection state to the portable device to the managing unit 2. When any one of the wireless subsystems 10, 20, and 30 is wirelessly connected to the portable device, the managing unit 2 determines YES in Step S130 and the control flow transitions to Step S140 on the basis of the received respond. On the other hand, when none of the wireless subsystems 10, 20, and 30 is wirelessly connected to the portable device, the managing unit 2 determines NO in Step S130 and the control flow transitions to Step S160.

In Step S140, the managing unit 2 instructs the wireless subsystems 10, 20, and 30 connected to the portable device to transmit subsystem information of the wireless subsystems 10, 20, and 30 by wired communication. The wireless subsystems 10, 20, and 30 having received the instruction transmit subsystem information to the managing unit 2 by wired communication. When the managing unit 2 receives the subsystem information, the control flow transitions to Step S150.

In Step S150, the managing unit 2 transmits new communication management information by wired communication. More specifically, the managing unit 2 updates the communication management information on the basis of the subsystem information acquired in Step S140. The managing unit 2 changes the communication management information such that the communication status of the wireless subsystems 10, 20, and 30 in which communication is congested due to the wireless communication with the portable device (hereinafter simply referred to as a "target subsystem") is improved. For example, the managing unit 2 increases the number of channels allocated to the target subsystem or appropriately changes the communication timing thereof. In addition, the managing unit 2 may decrease the number of channels allocated to the wireless subsystems 10, 20, and 30 other than the target subsystem or change the communication timing thereof. For example, when the target subsystem is the first wireless subsystem 10, some of the channels allocated to the second wireless subsystem 20 and the third wireless subsystem 30 up to that time may be additionally allocated to the first wireless subsystem 10.

The managing unit 2 transmits new communication management information to the wireless subsystems 10, 20, and 30 by wired communication. The wireless subsystems 10, 20, and 30 change settings of the wireless subsystems 10, 20, and 30 on the basis of the received new communication management information. When change of the communication conditions has been completed, the wireless subsystems 10, 20, and 30 perform the normal process of wireless communication based on the new communication conditions. When Step S150 is performed, the control flow ends.

In Step S160, the managing unit 2 transmits a signal indicating that there is no relevant unit by wired communication. The managing unit 2 transmits information indicating that there is no relevant unit, that is, no unit which wirelessly communicates with the portable device, to the wireless subsystems 10, 20, and 30 by wired communication. The wireless subsystems 10, 20, and 30 having received the signal indicating that there is no relevant unit perform a noise countermeasure operation. The wireless subsystems 10, 20, and 30 reduce an influence of noise, for example, by increasing a retransmission frequency or increasing a transmission output.

The warning unit 3 having received the signal indicating that there is no relevant unit sends a message to an occupant. The sent message is, for example, a message for requesting avoidance of wireless communication with the portable device or a message for transferring concern that the operations of the wireless subsystems 10, 20, and 30 will be destabilized. An example of a situation in which there is no relevant unit but wireless communication is congested is a situation in which wireless communication of the wireless subsystems 10, 20, and 30 is affected by wireless communication between portable devices. For example, when a channel which is used by the portable device overlaps channels which are allocated to the wireless subsystems 10, 20, and 30, the retransmission frequency or the channel occupation rate of the wireless subsystems 10, 20, and 30 is increased due to interference or collision. In this case, an improvement in the communication status can be expected by sending the message to the occupant. When Step S160 is performed, the control flow transitions to Step S170.

In Step S170, the managing unit 2 determines whether noise is mixed. When a signal or the like has been detected in a frequency band other than the frequency channels which are used by the wireless subsystems 10, 20, and 30, the managing unit 2 determines YES in Step S170. The control flow transitions to Step S180 when the determination result of Step S170 is positive, and the control flow ends when the determination result thereof is negative.

In Step S180, the managing unit 2 transmits a noise mixture warning signal by wired communication. The noise mixture warning signal is a signal indicating a warning that a decrease in wireless communication quality of the wireless subsystems 10, 20, and 30 or the like occurs due to noise. The master units of the wireless subsystems 10, 20, and 30 having received the noise mixture warning signal perform a noise countermeasure operation of increasing the retransmission frequency in the wireless subsystems 10, 20, and 30, increasing the transmission output, or the like. The warning unit 3 having received the noise mixture warning signal transfers a message indicating concern that the operations of the wireless subsystems 10, 20, and 30 will be destabilized to an occupant. When Step S180 is performed, the control flow ends.

(Second Improvement Process)

Figure 5:
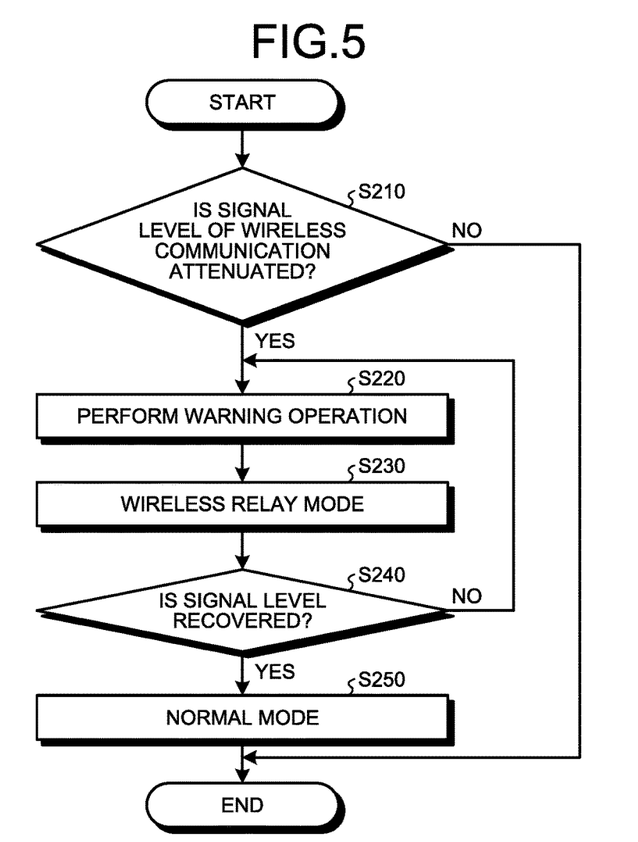
FIG. 5 is a flowchart of a second improvement process associated with the communication system according to the embodiment.

A communication status improvement process when a signal level is attenuated (hereinafter simply referred to as a "second improvement process") will be described below. FIG. 5 is a flowchart associated with the second improvement process. The flowchart illustrated in FIG. 5 is repeatedly performed by the managing unit 2.

In Step S210, the managing unit 2 determines whether a signal level of wireless communication is attenuated. One reason for attenuation of a signal level of wireless communication is that a metallic case is located in the vicinity of the wireless subsystems 10, 20, and 30. The managing unit 2 receives wireless communication in the wireless subsystems 10, 20, and 30 via the antenna 2c and monitors the wireless communication. The managing unit 2 determines YES in Step S210 when the signal level of wireless communication received via the antenna 2c is attenuated, and determines NO when the signal level is not attenuated. When the signal level of wireless communication is attenuated in the corresponding wireless subsystems 10, 20, and 30, the master units of the wireless subsystems 10, 20, and 30 transmit a wireless signal level attenuation signal by wired communication. The wireless signal level attenuation signal is transmitted, for example, when the wireless signal levels of the wireless subsystems 10, 20, and 30 are equal to or less than a prescribed value. The managing unit 2 determines YES in Step S210 when the wireless signal level attenuation signal is received, and determines NO when the wireless signal level attenuation signal is not received. The control flow transitions to Step S220 when the determination result of Step S210 is positive, and the control flow ends when the determination result thereof is negative.

In Step S220, the managing unit 2 performs a warning operation. The communication status improving unit 2b of the managing unit 2 transmits a warning to the warning unit 3 by wired communication. The warning unit 3 having received the warning transfers a message indicating that the wireless signal level is attenuated to an occupant. When Step S220 is performed, the control flows transitions to Step S230.

In Step S230, the managing unit 2 instructs switching to a wireless relay mode. The managing unit 2 instructs the master unit of the wireless subsystem in which the wireless signal level is determined to be attenuated in Step S210 (hereinafter referred to as a "target subsystem") among the wireless subsystems 10, 20, and 30 to switch to the wireless relay mode. The instruction to switch to the wireless relay mode is transmitted, for example, by wired communication. The wireless relay mode is a wireless communication mode in which the managing unit 2 is used as a wireless relay in the target subsystem. In the wireless relay mode, wireless communication between the master unit and the slave units and wireless communication between the slave units in the target subsystem are performed using the managing unit 2 as a relay. Improvement of the communication status is achieved by the wireless relay mode. The managing unit 2 notifies the warning unit 3 of switching to the wireless relay mode. The warning unit 3 transfers a message indicating the switching to the wireless relay mode to an occupant. When Step S230 is performed, the control flow transitions to Step S240.

In Step S240, the managing unit 2 determines whether the signal level has been recovered. The managing unit 2 determines YES in Step S240 when the wireless signal level in the target subsystem is detected to be restored to a level higher than a prescribed value, and determines NO in Step S240 when the wireless signal level is kept equal to or less than the prescribed value. The managing unit 2 determines YES in Step S240 when the wireless signal level attenuation signal is not received any more, and determines NO while receiving the wireless signal level attenuation signal. The control flow transitions to Step S250 when the determination result of Step S240 is positive that the signal level has been recovered, and the control flow transitions to Step S220 and the warning operation and the wireless relay mode are maintained when the determination result is negative.

In Step S250, the managing unit 2 performs return to the normal mode. The managing unit 2 transmits a normal mode return signal by wired communication. The target subsystem having received the normal mode return signal changes the wireless communication mode from the wireless relay mode to the normal mode. The warning unit 3 having received the normal mode return signal transfers a message indicating return to the normal mode to an occupant. When Step S250 is performed, the control flow ends.

(Third Improvement Process)

Figure 6:
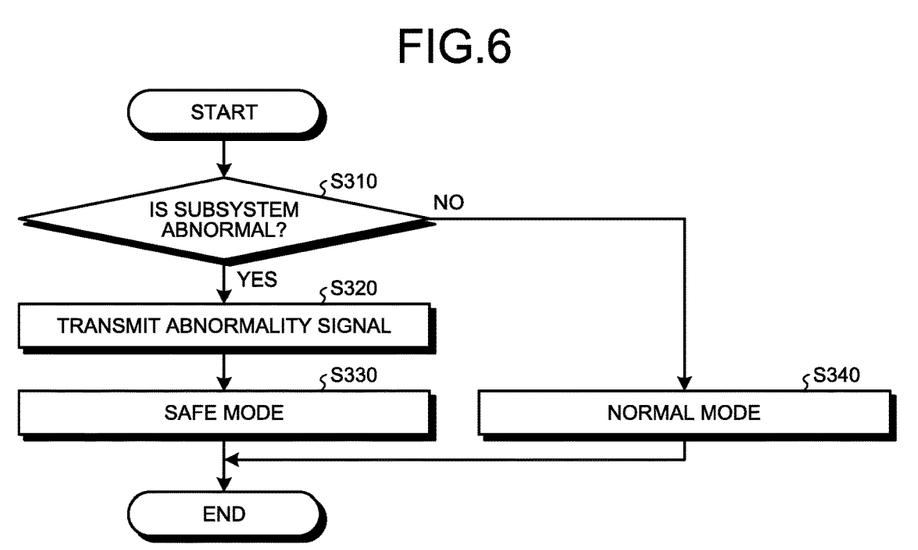
FIG. 6 is a flowchart of a third improvement process associated with the communication system according to the embodiment.

A communication status improvement process when an abnormality has occurred in a subsystem (hereinafter simply referred to as a "third improvement process") will be described below. FIG. 6 is a flowchart associated with the third improvement process. The flowchart illustrated in FIG. 6 is repeatedly performed by the managing unit 2.

In Step S310, the managing unit 2 determines whether an abnormality has occurred in the wireless subsystems 10, 20, and 30. When one of first to third conditions which will be described below is satisfied, the managing unit 2 determines that an abnormality has occurred in the wireless subsystems 10, 20, and 30. The first condition is that there is no response from the master units of the wireless subsystems 10, 20, and 30 in wired communication. The managing unit 2 and the master units of the wireless subsystems 10, 20, and 30 periodically transmit and receive information by wired communication. For example, the managing unit 2 periodically transmits an inquiry about a current state to the master units. The master units transmit current status information of the wireless subsystems 10, 20, and 30 to the managing unit 2 in response to the inquiry. When a response from the master unit has not been received within a predetermined time after the inquiry has been transmitted, the managing unit 2 determines that an abnormality has occurred in the wireless subsystems 10, 20, and 30.

The second condition is that an abnormality signal is received from the master units of the wireless subsystems 10, 20, and 30. For example, when an abnormality is detected by auto-diagnosis, the master units of the wireless subsystems 10, 20, and 30 transmit an abnormality signal by wired communication. When an abnormality signal is received from the master unit, the managing unit 2 determines that an abnormality has occurred in the wireless subsystems 10, 20, and 30 to which the master unit belongs. The third condition is that wireless communication is not performed in the wireless subsystems 10, 20, and 30. When a wireless signal of a channel allocated to the wireless subsystems 10, 20, and 30 is not detected over a predetermined time, the managing unit 2 determines that an abnormality has occurred in the wireless subsystems 10, 20, and 30 to which the channel has been allocated.

The control flow transitions to Step S320 when the determination result of Step S310 is positive that an abnormality has occurred in the wireless subsystems 10, 20, and 30, and the control flow transitions to Step S340 when the determination result is negative.

In Step S320, the managing unit 2 transmits an abnormality signal. The abnormality signal is a signal indicating an abnormality in the wireless subsystems 10, 20, and 30. The abnormality signal includes, for example, information indicating in which subsystem among the wireless subsystems 10, 20, and 30 an abnormality has occurred and a type of the occurring abnormality. The managing unit 2 transmits the abnormality signal by wired communication. The warning unit 3 having received the abnormality signal transfers a message indicating that there is an abnormality in the wireless subsystems 10, 20, and 30 to an occupant. When Step S320 is performed, the control flow transitions to Step S330.

In Step S330, the managing unit 2 performs a safe mode. A safe mode is a wireless communication mode in which an abnormal master unit is substituted by the managing unit 2. In the safe mode, the managing unit 2 continues to monitor the wireless communication of the wireless subsystems 10, 20, and 30 while substituting the abnormal master unit. When an abnormality has occurred in a master unit, the slave units belonging to the same wireless subsystems 10, 20, and 30 as the master unit perform appropriate operations such as system standby or communication with the managing unit 2. The slave unit on system standby temporarily stops the wireless communication with the master unit and waits for a command from the managing unit 2 by wireless communication. When an abnormality of the master unit is detected, the slave unit may transmit a signal indicating the abnormality to the managing unit 2 by wireless communication. When a switching instruction to the safe mode is issued from the managing unit 2, the slave unit performs the safe mode (a system substitution operation). When Step S330 is performed, the control flow ends.

In Step S340, the managing unit 2 performs the normal mode. The managing unit 2 operates in the normal mode which is a wireless communication mode when an abnormality has not occurred in any of the wireless subsystems 10, 20, and 30. The managing unit 2 transmits a normality signal indicating that an abnormality has not occurred in the wireless subsystems 10, 20, and 30 by wired communication. When a normality signal is received from the managing unit 2, the warning unit 3 transfers a message indicating that the wireless subsystems 10, 20, and 30 operate normally to an occupant. When Step S340 is performed, the control flow ends.

(Fourth Improvement Process)

A communication status improvement process when an abnormality has occurred in a slave unit of the wireless subsystems 10, 20, and 30 (hereinafter simply referred to as a "fourth improvement process") will be described below. The master units of the wireless subsystems 10, 20, and 30 periodically check states of the slave units belonging to the same wireless subsystems 10, 20, and 30. When an abnormal state of a slave unit is detected, the master unit transmits a slave abnormality signal by wired communication. When the slave abnormality signal from the wireless subsystems 10, 20, and 30 has been received, the managing unit 2 determines that an abnormality has occurred in the slave unit of the wireless subsystems 10, 20, and 30.

The fourth improvement process is performed, for example, on the basis of the flowchart illustrated in FIG. 6 similarly to the third improvement process. When a slave abnormality has occurred in the wireless subsystems 10, 20, and 30 (Step S310-Y), the managing unit 2 transmits an abnormality signal (Step S320) and performs the safe mode (Step S330). The warning unit 3 having received the abnormality signal transfers a message indicating that an abnormality has occurred in the wireless subsystems 10, 20, and 30 to an occupant. The warning unit 3 may transfer a message indicating that the vehicle system has transitioned to the safe mode. The wireless subsystems 10, 20, and 30 perform the safe mode in accordance with the instruction from the managing unit 2. In the safe mode, for example, operations or functions in the wireless subsystems 10, 20, and 30 in which an abnormality has occurred are limited. For example, when an abnormality has occurred in some slave units among a plurality of slave units and the remaining slave units operate normally, operations or functions associated with the abnormal slave units are invalidated. When a slave abnormality has not occurred in the wireless subsystems 10, 20, and 30, the managing unit 2 performs the normal mode (Step S340).

When a slave abnormality has occurred in the wireless subsystems 10, 20, and 30, the managing unit 2 may perform other appropriate operation instead of the safe mode. In this case, the wireless subsystems 10, 20, and 30 in which an abnormality has occurred perform an appropriate operation in accordance with an instruction from the managing unit 2.

(Process Flow when Wired Communication is Abnormal)

Figure 7:
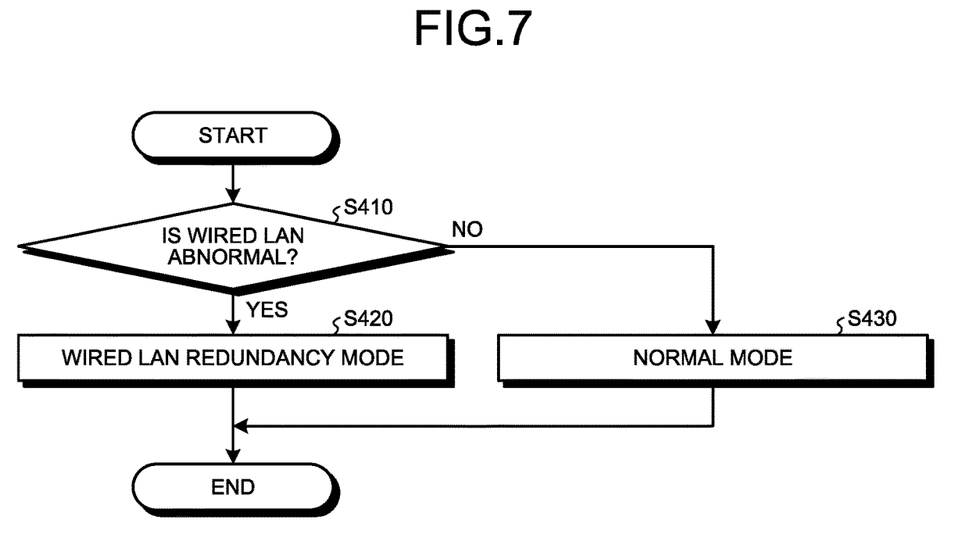
FIG. 7 is a flowchart illustrating processing when an abnormality has occurred in wired communication in the communication system according to the embodiment.

A process flow when an abnormality has occurred in wired communication will be described below. FIG. 7 is a flowchart illustrating a process flow when an abnormality has occurred in wired communication. The flowchart illustrated in FIG. 7 is repeatedly performed by the managing unit 2. In Step S410, the managing unit 2 determines whether an abnormality has occurred in the wired communication. When a wired communication signal has not been received over a predetermined time or when a wired communication abnormality signal has been received, the managing unit 2 determines that an abnormality has occurred in wired communication. The process flow transitions to Step S420 when the determination result of Step S410 is positive that an abnormality has occurred in wired communication, and the process flow transitions to Step S430 when the determination result is negative.

In Step S420, the managing unit 2 performs a wired LAN redundancy mode. The wired LAN redundancy mode is a communication mode in which redundancy for supplementing wired communication details and wireless communication details with each other is high. In the wired LAN redundancy mode, a new wireless communication network including the managing unit 2 and the wireless subsystems 10, 20, and 30 is set up. The managing unit 2 and the master units of the wireless subsystems 10, 20, and 30 transmit and receive information by wireless communication. The units constituting the wireless communication network transmit a signal, which has been received by wireless communication, by wired communication. The units transmit a signal having high significance among the signals received by wired communication to the units constituting the wireless communication network by wireless communication. In this way, in the wired LAN redundancy mode, the same information is transmitted by both the wireless communication and the wired communication.

When the operation mode is switched to the wired LAN redundancy mode, the managing unit 2 transmits a switching signal to the wired LAN redundancy mode by both the wired communication and the wireless communication. The master units of the wireless subsystems 10, 20, and 30 having received the switching signal to the wired LAN redundancy mode start the wired LAN redundancy mode. A dedicated channel for wireless communication which is used in the wired LAN redundancy mode may be secured in advance. When Step S420 is performed, the control flow ends.

In Step S430, the managing unit 2 performs the normal mode. The managing unit 2 operates in the normal mode which is a communication mode when an abnormality has not occurred in wired communication. When Step S430 is performed, the control flow ends.

When it is determined that an abnormality has occurred in wired communication, the warning unit 3 transfers a message indicating an abnormality in a wired LAN to an occupant. The method of determining an abnormality in wired communication is the same as the determination method by the managing unit 2.

(Process Flow when Managing Unit is Abnormal)

A process flow when an abnormality has occurred in the managing unit 2 will be described below. When the managing unit operates normally, the managing unit 2 periodically transmits a normal state signal by wireless communication. When the periodic normal state signal has not been received or when a signal indicating an abnormal state of the managing unit 2 has been received from the managing unit 2, the master units of the wireless subsystems 10, 20, and 30 transmit a managing unit abnormality signal by wired communication. The warning unit 3 having received the managing unit abnormality signal transfers a message indicating an abnormality of the managing unit 2 to an occupant.

Figure 8:
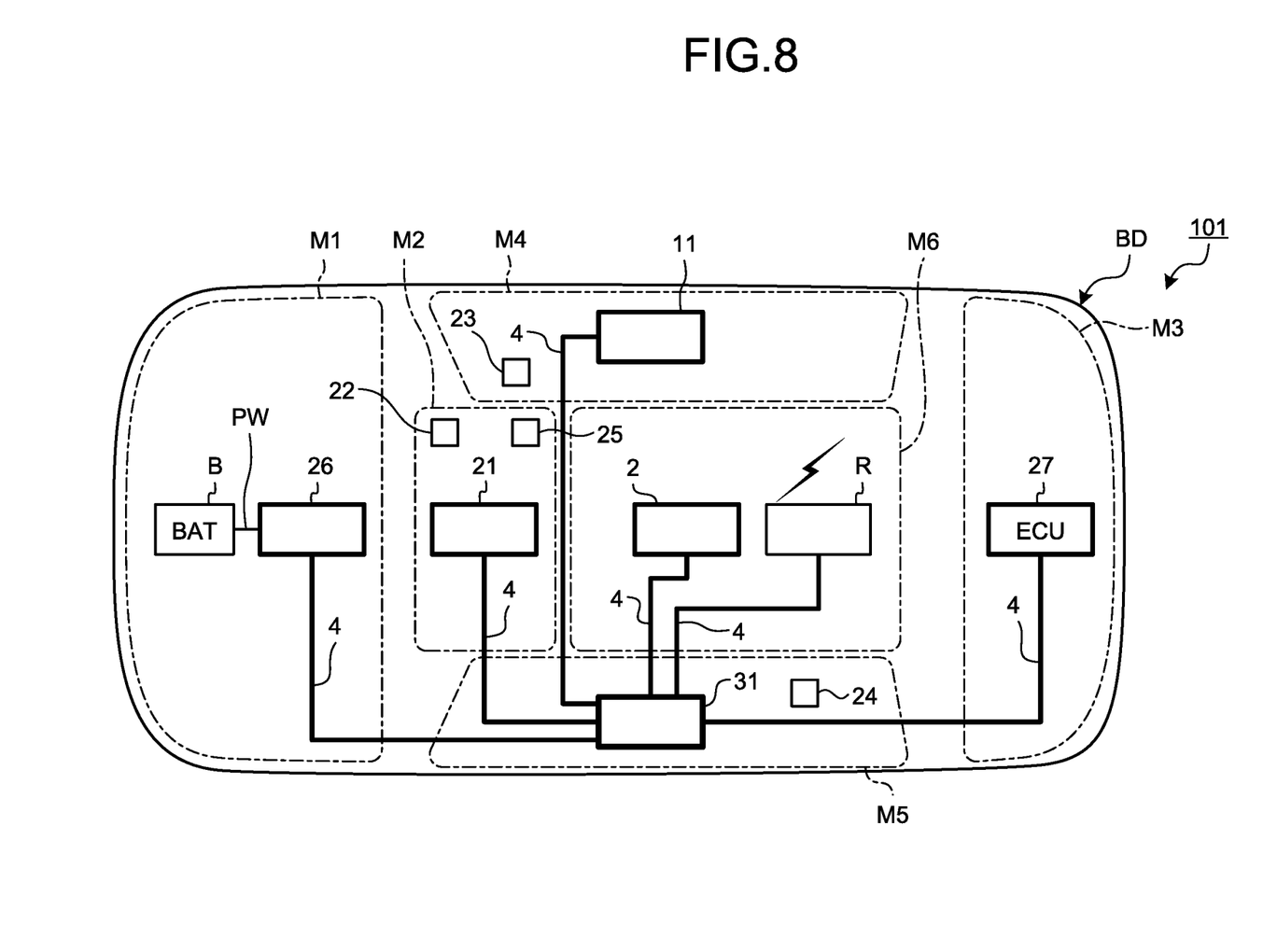
FIG. 8 is a diagram illustrating an example of an arrangement in a vehicle of the communication system according to the embodiment.

An example in which the communication system 100 according to this embodiment is mounted in a vehicle 101 will be described below with reference to FIG. 8. The vehicle 101 according to this embodiment includes a front module M1, an instrument panel module M2, a rear module M3, a first floor module M4, a second floor module M5, and a roof module M6. The front module M1 is a vehicle module that is provided in a front part of a body BD of the vehicle 101. The front module M1 is a module associated with an engine, a head lamp, a sensor that detects a situation in front of the vehicle, and the like. The front module M1 includes an ECU 26 that controls devices in the module. The ECU 26 is connected to a battery B via a power supply line PW.

The instrument panel module M2 is a vehicle module that is provided in an instrument panel. The instrument panel module M2 is a module associated with a meter, a head-up display, and the like. The instrument panel display unit 21, the air-conditioner ECU 22, and the steering heater unit 25 are disposed in the instrument panel module M2. The rear module M3 is a vehicle module that is provided in the rear part of the body BD. The rear module M3 is a module associated with a rear seat, a back lamp, a sensor that detects a situation in the back of the vehicle, and the like. The rear module M3 includes an ECU 27 that controls devices in the module.

The first floor module M4 is a vehicle module that is provided along a floor located between a front part and a rear part of the body BD. The first floor module M4 is a module associated with a driver seat, a front door and a rear door on the driver seat side, and the like. The door ECU 11 and the driver seat ECU 23 are provided, for example, in the first floor module M4.

The second floor module M5 is a vehicle module that is provided in parallel to the first floor module M4 along the floor of the body BD. The second floor module M5 is a module associated with a passenger seat, a front door and a rear door on the passenger seat side, and the like. The door ECU 31 and the passenger seat ECU 24 are provided, for example, in the second floor module M5.

The roof module M6 is a vehicle module that is provided on a roof disposed to face the floor of the body BD in the height direction. The roof module M6 is a module associated with an interior lamp, a sunroof, a sunshade, communication with the outside of the vehicle, and the like. The managing unit 2 is provided, for example, in the roof module M6. The roof module M6 includes an onboard router R that can communicate with a communication device outside the vehicle. The onboard router R is connected to the managing unit 2, the door ECUs 11 and 31, the instrument panel display unit 21, and the ECUs 26 and 27 via the communication line 4. The onboard router R communicates with a communication device outside the vehicle by wide-area wireless communication and narrow-area wireless communication. Examples of the wide-area wireless communication include radio (AM, FM), TV (UHF, 4K, 8K) TEL, GPS, WiMAX (registered trademark), and vehicle-to-vehicle communication. Examples of the narrow-area wireless communication include ETC/DSRC, VICS (registered trademark), wireless LAN, and millimeter wave communication.

As described above, the communication managing device 1 according to this embodiment includes the managing unit 2 including the monitoring unit 2a and the communication status improving unit 2b. The monitoring unit 2a monitors wireless communication between a plurality of communication devices that perform wireless communication in the vehicle 101 on the basis of a common communication standard. The communication devices include the door ECU 11 and the units 12, 13, 14, and 15 of the first wireless subsystem 10, the ECUs 22, 23, and 24 and the units 21 and 25 of the second wireless subsystem 20, and the door ECU 31 and the units 32, 33, 34, and 35 of the third wireless subsystem 30. The communication status improving unit 2b performs a countermeasure for improving the communication status of wireless communication on the basis of the monitoring result from the monitoring unit 2a. The communication managing device 1 including the monitoring unit 2a and the communication status improving unit 2b can improve stability of wireless communication in the vehicle.

The communication managing device 1 further includes the warning unit 3 as transfer means that transfers a message to an occupant in the vehicle 101. The communication status improving unit 2b transfers a message for requesting avoidance of wireless communication using a portable device based on the same communication standard as the wireless communication in the vehicle to the occupant using the warning unit 3. Accordingly, the communication status improving unit 2b can improve the communication status of wireless communication. Accordingly, the communication managing device 1 can improve stability of wireless communication in the vehicle.

In this embodiment, each of a plurality of communication devices belongs to any one of a plurality of wireless subsystems 10, 20, and 30 having different communication bands (channels) to be used. The communication status improving unit 2b improves the communication status of wireless communication by changing allocation of communication bands to the wireless subsystems 10, 20, and 30. Accordingly, collision or interference of wireless communication is avoided and stability of wireless communication in the vehicle is improved.

In the communication managing device 1 according to this embodiment, the communication status improving unit 2b improves the communication status of wireless communication in a vehicle by relaying wireless communication between a plurality of communication devices. Accordingly, stability of wireless communication in a vehicle is improved.

The communication system 100 according to this embodiment includes a plurality of communication devices that perform wireless communication in the vehicle 101 on the basis of a common communication standard, the monitoring unit 2a, and the communication status improving unit 2b. Accordingly, the communication system 100 according to this embodiment can improve stability of wireless communication in a vehicle.

Modified Examples of Embodiment

The arrangement of the ECUs is not limited to the example mentioned in the above-mentioned embodiment. For example, the location of the managing unit 2 is not limited to the roof, and may be located in a front windshield, a rear windshield, or a pillar of the body BD. The communication standard of the wireless subsystems 10, 20, and 30 are not limited to the above-mentioned communication standard, and may employ another communication standard such as a wireless LAN.

The second wireless subsystem 20 may further include a rear seat ECU and a heater, a blower, a thermistor, and a sensor which are disposed in the rear seat. The rear seat ECU has a function of a wireless communication device. The rear seat ECU adjusts the temperature of the rear seat in accordance with an instruction from the instrument panel display unit 21.

The communication managing device and the communication system according to the embodiment include a monitoring unit configured to monitor wireless communication between communication devices and a communication status improving unit configured to perform a countermeasure for improving a communication status of the wireless communication on the basis of the monitoring results. With the communication managing device and the communication system according to the embodiment, it is possible to achieve improvement in stability of wireless communication in a vehicle.

Details described in the above-mentioned embodiment and modified examples can be appropriately combined for implementation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication managing device comprising:
   a monitoring unit configured to monitor wireless communication between communication devices other than the communication managing device performing the wireless communication in a vehicle on the basis of a common communication standard; and
   a communication status improving unit configured to perform a countermeasure for improving a communication status of the wireless communication between the communication devices other than the communication managing device on the basis of a result of the monitoring.

2. The communication managing device according to claim 1, further comprising:
   a transfer means configured to send a message to an occupant in the vehicle, wherein
   the communication status improving unit improves the communication status of the wireless communication between the communication devices other than the communication managing device by sending a message, via the transfer means, of requesting the occupant to avoid wireless communication based on the communication standard by a portable device.

3. The communication managing device according to claim 1, wherein
   each of the communication devices other than the communication managing device belongs to one of a plurality of wireless subsystems having different communication bands to be used, and
   the communication status improving unit improves the communication status of the wireless communication between the communication devices other than the communication managing device by changing allocation of communication bands to the wireless subsystems.

4. The communication managing device according to claim 2, wherein
   each of the communication devices other than the communication managing device belongs to one of a plurality of wireless subsystems having different communication bands to be used, and
   the communication status improving unit improves the communication status of the wireless communication between the communication devices other than the communication managing device by changing allocation of communication bands to the wireless subsystems.

5. The communication managing device according to claim 1, wherein
the communication status improving unit improves the communication status of the wireless communication between the communication devices other than the communication managing device by relaying the wireless communication between the communication devices other than the communication managing device.

6. The communication managing device according to claim 2, wherein
the communication status improving unit improves the communication status of the wireless communication between the communication devices other than the communication managing device by relaying the wireless communication between the communication devices other than the communication managing device.

7. The communication managing device according to claim 3, wherein
the communication status improving unit improves the communication status of the wireless communication between the communication devices other than the communication managing device by relaying the wireless communication between the communication devices other than the communication managing device.

8. The communication managing device according to claim 4, wherein
the communication status improving unit improves the communication status of the wireless communication between the communication devices other than the communication managing device by relaying the wireless communication between the communication devices other than the communication managing device.

9. A communication system comprising:
a plurality of communication devices configured to perform wireless communication in a vehicle on the basis of a common communication standard;
a monitoring unit other than the communication devices configured to monitor the wireless communication between the communication devices; and
a communication status improving unit other than the communication devices configured to perform a countermeasure for improving a communication status of the wireless communication between the communication devices on the basis of a result of the monitoring.

* * * * *